(12) United States Patent
Fourel

(10) Patent No.: US 6,176,404 B1
(45) Date of Patent: Jan. 23, 2001

US006176404B1

(54) SEAL ADAPTED TO COVER THE LONGITUDINAL GROOVE IN A ROOF BAR

(75) Inventor: Pascal Fourel, Saint Malo (FR)

(73) Assignee: Automaxi Industries (FR)

(*) Notice: Under 35 U.S.C. 154(b), the term of this patent shall be extended for 0 days.

(21) Appl. No.: 09/323,353

(22) Filed: Jun. 1, 1999

(51) Int. Cl.[7] .................................. B60R 9/04; B60R 9/05
(52) U.S. Cl. ........................... 224/309; 224/316; 224/321
(58) Field of Search .................................. 224/309, 316, 224/317, 321, 322, 325, 326

(56) References Cited

U.S. PATENT DOCUMENTS

| | | | |
|---|---|---|---|
| 4,165,827 | * 8/1979 | Bott | 224/326 |
| 4,239,139 | * 12/1980 | Bott | 224/325 X |
| 5,004,139 | * 4/1991 | Strom et al. | 224/309 X |
| 5,025,967 | * 6/1991 | Cronce et al. | 224/309 X |
| 5,511,709 | * 4/1996 | Fisch | 224/326 X |

FOREIGN PATENT DOCUMENTS

| | | | |
|---|---|---|---|
| 4113230 | * 10/1992 | (DE) | 224/309 |
| 0 503 306 A1 | 2/1992 | (EP). | |
| 2191747 | * 12/1987 | (GB) | 224/325 |
| 247540 | * 12/1987 | (JP) | 224/309 |

* cited by examiner

Primary Examiner—Gregory M. Vidovich
(74) Attorney, Agent, or Firm—Harness, Dickey & Pierce, P.L.C.

(57) ABSTRACT

A seal covers a longitudinal groove forming a slide on the top of a roof bar which has in cross section, on its face that faces upward, two longitudinal lips projecting substantially toward each other to cover partly a longitudinal cavity of the bar and to define the groove between them. The seal has on each longitudinal lateral edge a conformation of substantially U-shaped cross section complementary to that of the corresponding longitudinal lip in order to interengage with the lip. The seal has two longitudinal cuts on its face facing toward the cavity, between the two longitudinal lateral conformations. The cuts extend from that face to the vicinity of a top surface of the seal to form a longitudinal central tongue between the cuts which is easily separated from the two longitudinal lateral parts of the seal.

21 Claims, 1 Drawing Sheet

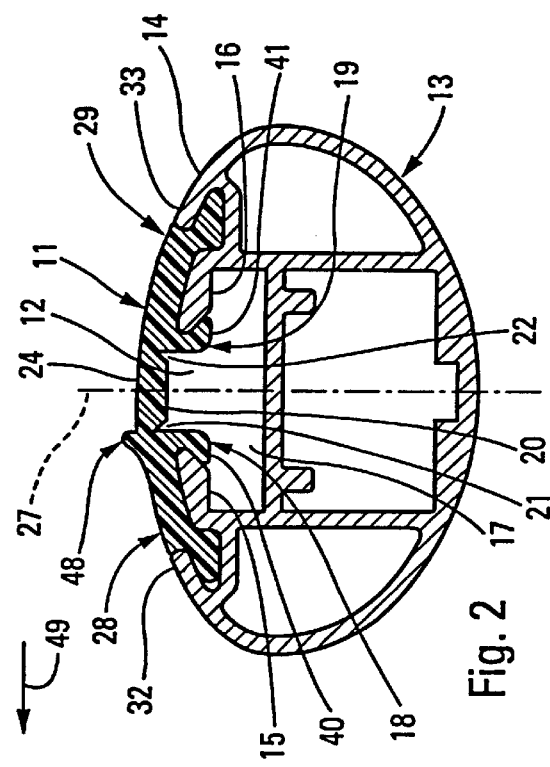
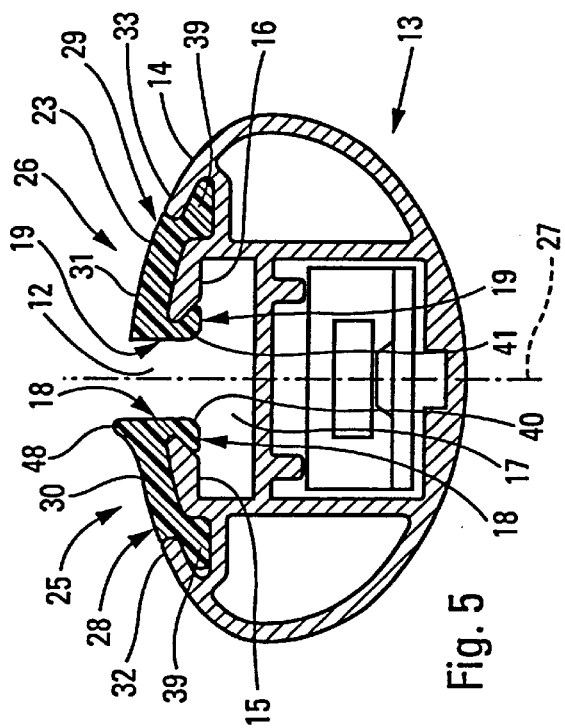
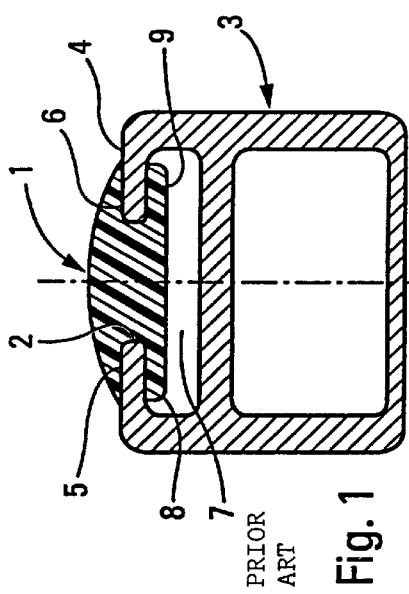
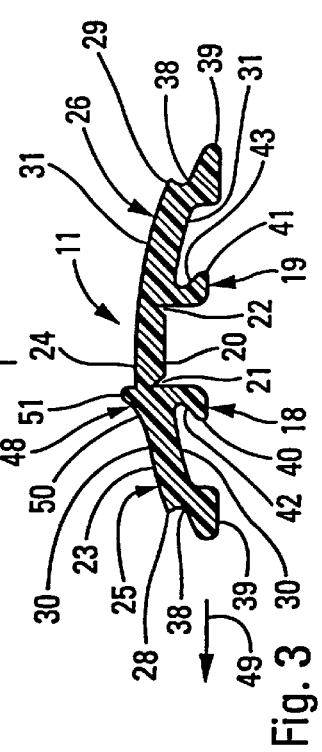
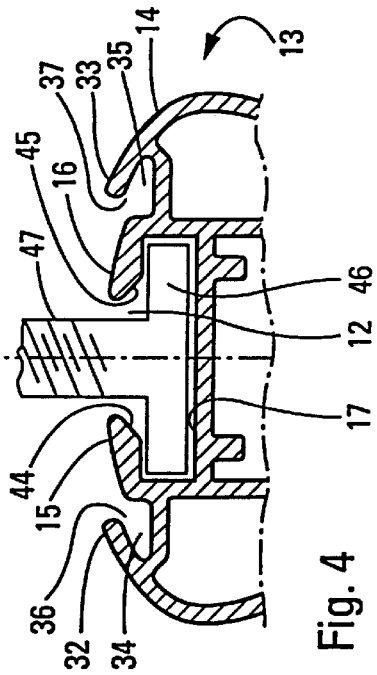
Fig. 1 PRIOR ART
Fig. 2
Fig. 3
Fig. 4
Fig. 5

SEAL ADAPTED TO COVER THE LONGITUDINAL GROOVE IN A ROOF BAR

BACKGROUND OF THE INVENTION

1. Field of the Invention

The present invention concerns a seal adapted to cover a longitudinal groove forming a slide in the top of a roof bar which has in cross section, on its face that faces upward, two longitudinal lips projecting substantially toward each other to cover partly a longitudinal cavity of the bar and to define the groove between them, the seal having on each longitudinal lateral edge a conformation of substantially U-shaped cross section complementary to that of the corresponding longitudinal lip in order to interengage with the lip.

2. Description of the Prior Art

FIG. 1 shows a prior art roof bar 3 comprising a light metal extrusion. Two longitudinal lips 5, 6 partly covering the cavity 7 enable the insertion into said cavity 7 of T-shaped members, for example screws with a T-shaped head or T-shaped supports, for fixing to two substantially parallel roof bars 3 various objects such as bicycle carriers, luggage carriers, ski carriers.

In the conventional way, a seal 1 of the aforementioned type covers the groove 2 and is interengaged with the two lips 5, 6 which define the top face 4 of the bar 3.

The seal is generally made of rubber or preferably of a plastics material such as PVC and has more than one function. It lies between the extrusion constituting the bar and the object fixed to the bar to prevent metal-to-metal contact. It also covers the groove in the bar which otherwise could cause an extremely unpleasant noise at high speed. A seal of the above kind is generally extruded and threaded over the two lips from one end of the bar to the other and is difficult to use when it comes to introducing a member of any kind, such as the head of a screw, into the cavity: either the seal or its central part is partly destroyed, where a screw with a T-shaped head is inserted into the groove and turned 90° so that the head interengages with the two lips of the bar or the seal is cut into a number of lengths that are threaded successively over the two lips of the bar after interleaving between two adjacent lengths any member to be inserted into the cavity, such as the head of a screw.

Failing this, it may be necessary to remove the seal completely.

Users find partial destruction of the seal at certain places or lengths of seal between fixing members unsatisfactory from the esthetic point of view.

Finally, from the aerodynamic point of view, the parts of each bar that are not covered and protected by the seal generate noise at high speeds, the nuisance value and intolerability of which are in proportion to their length.

The aim of the present invention is to remedy the drawbacks of prior art seals and bars and to propose a seal of simple and economic structure that is very easy to use but fulfills perfectly the aforementioned functions of eliminating all metal-to-metal contact, esthetic covering, ease of use and elimination of aerodynamic noise.

Another aim of the present invention is to propose a roof bar adapted to receive a seal constituting the first aspect of the invention.

SUMMARY OF THE INVENTION

In one aspect, the invention consists in a seal adapted to cover a longitudinal groove forming a slide on the top of a roof bar which has in cross section on its face that faces upward two longitudinal lips projecting substantially toward each other to cover partly a longitudinal cavity of said bar and to define said groove between them, said seal having on each longitudinal lateral edge a conformation of substantially U-shaped cross section complementary to that of the corresponding longitudinal lip in order to interengage with said lip, said seal having on its face facing toward said cavity, between said two longitudinal lateral conformations, two longitudinal cuts extending from said face to the vicinity of a top surface of said seal to form between said cuts a longitudinal central tongue adapted to be easily separated from said two longitudinal lateral parts of said seal.

Accordingly, when the seal is in place in the groove of the roof bar the central tongue can be easily pulled out or separated along all or part of the length of the bar to uncover the groove, leaving the two longitudinal lateral parts in place on the respective corresponding lips of the roof bar.

These longitudinal lateral parts protect the bar against rubbing contact with the transported objects by eliminating all metal-to-metal contact. They also embellish the roof bar.

The groove is uncovered so that T-shaped heads of screws can be inserted into the cavity to fix various supports.

When the tongue is pulled out along all the length of the bar, T-shaped members for fixing supports of any kind can be inserted into the cavity and into the groove from the end of the bar.

In an advantageous version of the invention, there is a second longitudinal lateral conformation on at least one longitudinal lateral edge which in cross section extends outward relative to the corresponding longitudinal conformation, extending its top branch, and having a shape in cross section adapted to interengage with at least one second conjugate longitudinal lateral member of the bar to prevent movement of the corresponding lateral part of the seal in a cross section plane of the seal.

In a preferred version of the invention, the conjugate longitudinal lateral member of the bar is a second longitudinal lateral lip which partly covers a corresponding longitudinal lateral cavity of the bar forming a corresponding longitudinal lateral groove of the bar, wherein the corresponding second longitudinal lateral conformation of the seal has a shape in cross section including a first portion forming a foot adapted to pass through the corresponding lateral groove and a portion forming a head extending the portion forming a foot and adapted substantially to fill a corresponding lateral cavity of the bar.

In this way the two longitudinal lateral parts of the seal are firmly anchored to the roof bar and are perfectly able to support the loads to be fixed to the bars.

Other features and advantages of the invention will become apparent in the course of the following detailed description.

BRIEF DESCRIPTION OF THE DRAWINGS

In the accompanying drawings, which are given by way of non-limiting example only:

FIG. 1 is a diagrammatic view in cross section of a roof bar fitted with a prior art seal;

FIG. 2 is a diagrammatic view in cross section of a roof bar fitted with one embodiment of a seal in accordance with the present invention;

FIG. 3 is a view similar to FIG. 2 showing the seal in isolation;

FIG. 4 is a fragmentary view similar to FIG. 2 showing the upper part of the roof bar in isolation, with the T-shaped head of a screw engaged in the cavity of said bar; and FIG. 5 is a view similar to FIG. 2 with the longitudinal central tongue removed.

DETAILED DESCRIPTION OF THE PREFERRED EMBODIMENT

In the embodiment shown in FIGS. 2 to 5, the seal 11 is adapted to cover the longitudinal groove forming a slide 12 of a roof bar 13. The bar 13 is represented in the position it occupies when it is in place on the roof of a motor vehicle, the groove being on the upward facing top face 14 of the bar 13.

Seen in cross section, the roof bar 13 has on its upward facing face 14 two longitudinal lips 15, 16 projecting substantially toward each other to cover partly a longitudinal cavity 17 of the bar 13 and to define the groove 12 between them.

The seal 11 has a pair of laterally spaced, longitudinally extending conformations 18, 19 each of which has a substantially U-shaped cross section complementary to that of the corresponding longitudinal lip 15, 16 of the bar 13 in order to interengage with the lip 15, 16.

In accordance with the invention, the seal 11 has on its face 20 facing toward the cavity 17 of the bar 13, between the two longitudinal lateral conformations 18, 19, two longitudinal inverted-V-shaped cuts 21, 22 extending upward from said bottom face 20 as far as the vicinity of the top face 23 of the seal 11, forming a longitudinal central tongue 24 between the cuts 21, 22 that is easily separated from the two longitudinal lateral parts 25, 26 of the seal 11.

In the embodiment shown, in which the roof bar 13 has a substantially vertical longitudinal plane of symmetry 27, the seal 11 has on each longitudinal lateral edge a second longitudinal lateral conformation 28, 29 which in cross section extends outward relative to the corresponding first longitudinal conformation 18, 19, extending the top branch 30, 31 thereof.

Each second longitudinal lateral conformation 28, 29 has a shape in cross section adapted to interengage with a conjugate second longitudinal lateral member 32, 33 of the bar 13 to prevent any movement of the corresponding longitudinal lateral part 25, 26 of the seal 11 in a cross section plane of the seal 11.

Thus no lateral longitudinal part 25, 26 of the roof bar 13 can be extracted either by applying traction in any direction in the plane of the figure or by rotation in the plane of the figure. The longitudinal lateral part 25, 26 can be extracted only by applying traction in the longitudinal direction of the bar, perpendicular to the plane of the figure.

In the embodiment shown the conjugate second longitudinal lateral member 32, 33 of the bar 13 is a second longitudinal lateral lip 32, 33 partly covering a corresponding longitudinal cavity 34, 35 in the bar 13 forming a corresponding lateral longitudinal groove 36, 37 of the bar 13.

Each second longitudinal lateral conformation 28, 29 of the seal 11 has a shape in cross section having a first portion forming a foot 38 adapted to pass through the corresponding lateral groove 36, 37 and a portion forming a head 39 extending the portion forming a foot 38 and adapted substantially to fill the corresponding lateral longitudinal cavity 34, 35 of the bar 11.

As shown in FIG. 5, when the longitudinal central tongue 24 has been removed, each longitudinal lateral part 25, 26 of the seal 11 is perfectly anchored to the corresponding conformations of the roof bar 13.

In particular, the bottom branch 40, 41 of the first conformation 18, 19 has a wall 42, 43 inclined outward and downward that is adapted to interengage with a conjugate wall 44, 45 of the corresponding lip 15, 16 of the roof bar 13 inclined in substantially the same direction.

The bottom branch 40, 41 is therefore interengaged with the corresponding lip 15, 16 without reducing the space available in the cavity 17 for inserting the T-shaped head 46 of a screw 47, as shown diagrammatically in FIG. 4, or any other T-shaped member that can be inserted into the cavity 17.

In the example shown, the seal 11 has on the top face 23 of a longitudinal lateral part 25, substantially vertically above and outside one longitudinal cut, here the cut 21, a longitudinal member 48 projecting upward which in cross section has an aerodynamic shape adapted to guide the airflow over the bar 13. The member 48 remains on the part 25 when the tongue 24 is removed.

The aerodynamic member 48 is provided on the longitudinal lateral part 25 disposed in the direction 49 of movement of a vehicle carrying the roof bar 13.

Starting from the top surface 23, the aerodynamic member 48 has a rounded concave first part 50 terminating at the top in a convex second part 51.

Thus when the vehicle is moving in the direction 49 the projecting member 48 causes the airflow to pass over the second longitudinal lateral part 26. This eliminates the intense and annoying aerodynamic noise usually encountered with extrusions like the bar 13 having an open groove at the top like the groove 12.

A seal 11 has therefore been described which has in cross section a constant shape adapted to be extruded and to cooperate with a roof bar 13 itself having in cross section a constant shape adapted to be extruded.

The seal is therefore advantageously made from a rigid or semi-rigid plastics material, for example PVC, adapted to be extruded.

Of course, the present invention is not limited to the embodiments just described and many changes and modifications can be made to the latter without departing from the field of the invention.

In the example shown, the second lips 32, 33 of the bar 13 are directed toward the plane of symmetry 27 and their end is received in the shoulder formed by the corresponding section forming a foot 38, for obvious aerodynamic reasons. The second lips could extend in the opposite direction, or any other direction, the respective external shapes of the seal 11 and the bar 13 being designed to complement each other in a regular contour of the bar and its seal from the aerodynamic point of view.

The two second longitudinal lateral conformations 28, 29 of the seal 11 can be different.

There is claimed:

1. A seal adapted to cover a longitudinal groove forming a slide on the top of a roof bar which has in cross section on its face that faces upward two longitudinal lips projecting substantially toward each other to cover partly a longitudinal cavity of said bar and to define said groove between them, said seal having a pair of laterally spaced longitudinally extending conformations of substantially U-shaped cross section complementary to that of the corresponding longitudinal lips in order to interengage with said lips, said seal having on its face facing toward said cavity, between said two longitudinal lateral conformations, two longitudinal cuts extending from said face to the vicinity of a top surface of said seal to form between said cuts a longitudinal central tongue adapted to be easily separated from said two longitudinal lateral conformations of said seal.

2. The seal claimed in claim 1 further comprising a second longitudinal lateral conformation on at least one longitudinal lateral edge which in cross section extends outwardly relative to the corresponding longitudinal conformation and having a shape in cross section adapted to interengage with at least one second conjugate longitudinal lateral member of said bar to prevent movement of the corresponding one of the lateral conformations of said seal in a cross section plane of said seal.

3. The seal claimed in claim 2 wherein said conjugate longitudinal lateral member of said bar is a second longitudinal lateral lip which partly covers a corresponding longitudinal lateral cavity of said bar forming a corresponding longitudinal lateral groove of said bar and the corresponding second longitudinal lateral conformation of said seal has a shape in cross section including a first portion forming a foot adapted to pass through the corresponding lateral groove and a portion forming a head extending said portion forming a foot and adapted substantially to fill the corresponding lateral cavity of said bar.

4. The seal claimed in claim 3 having two longitudinal lateral conformations on respective opposite sides of said separable longitudinal central tongue.

5. The seal claimed in claim 1 further comprising on a top face of one of said conformations a longitudinal lateral part extending substantially vertically above and outside one of said longitudinal cuts, a longitudinal member projecting upward and having in cross section an aerodynamic shape adapted to guide the airflow over said bar.

6. The seal claimed in claim 1 having a constant shape in cross section adapted to be extruded and to cooperate with a roof bar having a constant shape in cross section adapted to be extruded.

7. The seal claimed in claim 1 made from a rigid or semi-rigid plastics material.

8. A roof bar fitted with a seal, said roof bar comprising a longitudinal groove forming a slide on the top of said roof bar which has in cross section on its upper face two longitudinal lips projecting substantially laterally toward each other to cover partly a longitudinal cavity of said roof bar and to define said groove between them, said seal being adapted to cover said longitudinal groove and having a pair of laterally spaced longitudinally extending conformations of substantially U-shaped cross section complementary to that of the corresponding longitudinal lips in order to interengage with said lips, said seal having on its face facing toward said cavity, between said two longitudinal lateral conformations, two longitudinal cuts extending from said face to the vicinity of a top surface of said seal to form between said cuts a longitudinal central tongue adapted to be easily separated from said two longitudinal lateral conformations of said seal.

9. A roof bar according to claim 8 with said seal further comprising a second longitudinal lateral conformation on at least one longitudinal lateral edge which in cross section extends outwardly relative to the corresponding longitudinal conformation and having a shape in cross section adapted to interengage with at least one second conjugate longitudinal lateral member of said roof bar to prevent movement of the corresponding one of the lateral conformations of said seal in a cross section plane of said seal.

10. A roof bar according to claim 9 wherein said conjugate longitudinal lateral member of said bar is a second longitudinal lateral lip which partly covers a corresponding longitudinal lateral cavity of said roof bar forming a corresponding longitudinal lateral groove of said roof bar and the corresponding second longitudinal lateral conformation of said seal has a shape in cross section including a first portion forming a foot adapted to pass through the corresponding lateral groove and a portion forming a head extending said portion forming a foot and adapted substantially to fill the corresponding lateral cavity of said roof bar.

11. A roof bar according to claim 10 with said seal having two longitudinal lateral conformations on respective opposite sides of said separable longitudinal central tongue.

12. A roof bar according to claim 8 with said seal further comprising on a top face of one of said conformations a longitudinal lateral part extending substantially vertically above and outside one of said longitudinal cuts, a longitudinal member projecting upward and having in cross section an aerodynamic shape adapted to guide the airflow over said roof bar.

13. A roof bar according to claim 8 with said seal having a constant shape in cross section adapted to be extruded and to cooperate with said roof bar having a constant shape in cross section adapted to be extruded.

14. A roof bar according to claim 8 with said seal being made from a rigid or semi-rigid plastic material.

15. A roof bar fitted with a seal, said roof bar comprising a longitudinal groove forming a slide on the top of said roof bar which has in cross section on its upper face two longitudinal lips projecting substantially laterally toward each other to cover partly a longitudinal cavity of said roof bar and to define said groove between them, said seal being adapted to cover said longitudinal groove and having a pair of laterally spaced longitudinally extending conformations of substantially U-shaped cross section complementary to that of the corresponding longitudinal lips in order to interengage with said lips, said seal having on its face facing toward said cavity, between said two longitudinal lateral conformations, two longitudinal cuts extending from said face to the vicinity of a top surface of said seal to form between said cuts a longitudinal central tongue adapted to be easily separated from said two longitudinal lateral conformations of said seal, said longitudinal central tongue of said seal constructed such that when it has been separated, it includes on respective opposite lateral sides of said longitudinal central groove two longitudinal lateral parts of said seal respectively interengaged with at least one corresponding longitudinal lip and, where appropriate, at least one corresponding second longitudinal lateral member of said roof bar.

16. A roof bar according to claim 15 with said seal further comprising a second longitudinal lateral conformation on at least one longitudinal lateral edge which in cross section extends outwardly relative to the corresponding longitudinal conformation and having a shape in cross section adapted to interengage with at least one second conjugate longitudinal lateral member of said roof bar to prevent movement of the corresponding lateral conformation of said seal in a cross section plane of said seal.

17. A roof bar according to claim 16 wherein said conjugate longitudinal lateral member of said bar is a second longitudinal lateral lip which partly covers a corresponding longitudinal lateral cavity of said roof bar forming a corresponding longitudinal lateral groove of said roof bar and the corresponding second longitudinal lateral conformation of said seal has a shape in cross section including a first portion forming a foot adapted to pass through the corresponding lateral groove and a portion forming a head extending said portion forming a foot and adapted substantially to fill the corresponding lateral cavity of said roof bar.

18. A roof bar according to claim 17 with said seal having two longitudinal lateral conformations on respective opposite sides of said separable longitudinal central tongue.

19. A roof bar according to claim 15 with said seal further comprising on a top face of one of said conformations a longitudinal lateral part extending substantially vertically above and outside one of said longitudinal cuts, a longitudinal member projecting upward and having in cross section an aerodynamic shape adapted to guide the airflow over said roof bar.

20. A roof bar according to claim 15 with said seal having a constant shape in cross section adapted to be extruded and to cooperate with said roof bar having a constant shape in cross section adapted to be extruded.

21. A roof bar according to claim 15 with said seal being made from a rigid or semi-rigid plastic material.

* * * * *

UNITED STATES PATENT AND TRADEMARK OFFICE
CERTIFICATE OF CORRECTION

PATENT NO. : 6,176,404 B1
DATED : January 23, 2001
INVENTOR(S) : Pascal Fourel

Page 1 of 1

It is certified that error appears in the above-identified patent and that said Letters Patent is hereby corrected as shown below:

Insert after "Filed: June 1, 1999"

-- Foreign Application Priority Data

June 19 1998    [FR]    France ................98 07790 --.

Signed and Sealed this

Twenty-third Day of October, 2001

Attest:

NICHOLAS P. GODICI
Attesting Officer        Acting Director of the United States Patent and Trademark Office